US008667765B1

(12) United States Patent
McCarthy

(10) Patent No.: US 8,667,765 B1
(45) Date of Patent: Mar. 11, 2014

(54) METHOD OF SUPPORTING DRYWALL

(71) Applicant: Jennifer M. McCarthy, South Hadley, MA (US)

(72) Inventor: Jennifer M. McCarthy, South Hadley, MA (US)

(*) Notice: Subject to any disclaimer, the term of this patent is extended or adjusted under 35 U.S.C. 154(b) by 0 days.

(21) Appl. No.: 13/750,256

(22) Filed: Jan. 25, 2013

(51) Int. Cl.
*E04B 2/70* (2006.01)

(52) U.S. Cl.
USPC ........ 52/745.1; 52/127.1; 52/712; 52/745.21; 52/749.1; 296/3; 296/6; 248/301

(58) Field of Classification Search
USPC ............... 52/127.2, 702, 745.1, 747.1, 749.1, 52/712, 127.1, 745.21; 411/461, 466; 414/11; 248/301, 304, 544, 447.1, 248/217.3, 218.4; 269/3, 6, 49
See application file for complete search history.

(56) References Cited

U.S. PATENT DOCUMENTS

| | | | | |
|---|---|---|---|---|
| 1,651,392 | A * | 12/1927 | Honigbaum | 52/548 |
| 2,345,419 | A * | 3/1944 | Olson | 403/279 |
| 3,143,219 | A | 8/1964 | Aldrich | |
| 3,189,137 | A * | 6/1965 | Harris | 52/765 |
| 3,298,651 | A * | 1/1967 | Passer | 248/217.2 |
| 4,089,141 | A * | 5/1978 | Heroux | 52/105 |
| 4,254,945 | A * | 3/1981 | Paulson et al. | 269/102 |
| 4,449,338 | A * | 5/1984 | Reicherts | 52/127.8 |
| 4,935,998 | A * | 6/1990 | Frazier et al. | 24/350 |
| 5,002,446 | A | 3/1991 | Anderson | |
| 5,224,309 | A | 7/1993 | Bodell | |
| 5,249,405 | A | 10/1993 | Miller | |
| 5,267,718 | A * | 12/1993 | Sheehan | 248/475.1 |
| 5,564,236 | A * | 10/1996 | McKinney et al. | 52/127.2 |
| 5,619,836 | A * | 4/1997 | Rouch et al. | 52/715 |
| 5,640,826 | A | 6/1997 | Hurilla, Jr. | |
| 5,642,597 | A * | 7/1997 | Hendrickson | 52/715 |
| 5,884,447 | A * | 3/1999 | Earp | 52/489.1 |
| 5,885,024 | A * | 3/1999 | Zupan et al. | 403/389 |
| 6,131,361 | A * | 10/2000 | Murphy | 52/712 |
| 6,161,824 | A * | 12/2000 | Gustavson | 269/43 |
| 6,364,303 | B1 * | 4/2002 | Gustavson | 269/37 |
| 6,494,513 | B2 | 12/2002 | Worthington | |
| 6,622,438 | B2 * | 9/2003 | Hurlock | 52/127.2 |
| 6,640,512 | B1 * | 11/2003 | Kinnaman et al. | 52/489.1 |
| 6,725,619 | B1 * | 4/2004 | Barber | 52/712 |
| 7,225,590 | B1 * | 6/2007 | diGirolamo et al. | 52/379 |
| 7,373,862 | B2 | 5/2008 | Tyler | |
| D589,334 | S * | 3/2009 | Hotchkiss, III | D8/382 |
| 7,980,032 | B2 * | 7/2011 | Moffatt | 52/204.55 |
| 8,205,394 | B1 * | 6/2012 | Jackman et al. | 52/35 |
| 8,303,228 | B2 | 11/2012 | Gosis et al. | |

(Continued)

OTHER PUBLICATIONS

Free Hands Drywall Cletes, "Free Hands Drywall Installation Tool", website advertisement, Dec. 20, 2012, Material Handling Cheap Price.

*Primary Examiner* — Robert Canfield
(74) *Attorney, Agent, or Firm* — Donald S. Holland, Esq.; Holland & Bonzagni, P.C.

(57) ABSTRACT

Applicant has disclosed a method and device (i.e., support tool) for installing sheathing (e.g., drywall or plasterboard). This tool enables a single person to easily attach the sheathing (e.g., by nails or screws) to an underlying structure (e.g., a wall stud, joist or rafter). In the preferred "device" embodiment, Applicant's tool is generally J-shaped with four tapered spikes ("teeth") on its backside. The spikes are equally spaced from one another. By hammering the tool, its spikes can be driven into the underlying structure. No separate nail or screw is needed to hold the tool in place.

6 Claims, 1 Drawing Sheet

(56) References Cited

U.S. PATENT DOCUMENTS

2004/0237443 A1* 12/2004 Haley et al. .................. 52/545
2005/0166484 A1 8/2005 Richmond
2006/0185278 A1 8/2006 Jaffe
2008/0053036 A1* 3/2008 Graham .................. 52/749.1

* cited by examiner

METHOD OF SUPPORTING DRYWALL

FIELD OF INVENTION

The present invention relates generally to sheathing (e.g., drywall) used in building constructions. More particularly, it relates to support tools for fastening sheathing.

BACKGROUND OF THE INVENTION

Sheet materials (a.k.a. sheathing), such as drywall and Sheetrock® plasterboard, are commonly used in residential, commercial and industrial buildings for covering walls or ceilings. The sheets are manufactured in standard sizes, such as 4×8 feet or 4×12 feet. Due to the size and weight of these sheet materials, fastening of the sheets to horizontal, vertical, or angular studs, joists, rafters or trusses can be tiring and awkward, especially when only one or two installers are on the job site.

Various devices have been used to temporarily support the sheets before attaching them to the underlying structures such as wall studs or roof rafters. They usually are designed to allow one installer to do the job. Many though are cumbersome and expensive. Others require the use of separate nails or screws to attach them.

Typically "dead man" braces, panel lifts or jacks, clamps, clips, and so-called "cleats" have been used. Examples are disclosed below.

A "dead man" brace is typically fabricated from at least two pieces of 2×4 foot lumber in a "T" orientation, and is generally used to temporarily support sheetrock during ceiling installation. It is generally fabricated on the job site to accommodate a specific height dimension, is large and cumbersome in its size, and is not easily transported from one job site to the next.

U.S. Pat. No. 3,143,219 to Aldrich et al. discloses a "Ceiling Board Jack" for supporting ceiling boards. The "Ceiling Board Jack" has several moving pieces which have to be manipulated for the Jack to work.

U.S. Pat. No. 5,002,446 to Anderson, entitled "Tool for Overhead Sheet Installation", discloses a support tool for sheet material. Anderson's tool incorporates a screw and a base with a ledge to support the sheet material.

U.S. Pat. No. 5,224,309 to Bodell, entitled "Temporary Cleat for Sheet Goods", describes a relatively thin and wide multi-piece assembly that temporarily supports sheet material. The cleat is nailed to an underlying support and is adjustable to accommodate sheet material of various thicknesses.

U.S. Pat. No. 5,249,405 to Miller, entitled "Drywall Support", describes a relatively thin flat device, except for a right angle offset. The flat portion has two ends, one of which is pointed. By hammering the other end, the pointed end can be driven into a stud for the temporary support of sheetrock.

U.S. Pat. No. 5,640,826 to Hurilla, Jr. discloses a "Sheetrock Lifting Apparatus" for lifting a Sheetrock® sheet to a ceiling, and then aligning the sheet prior to nailing. The lifting device includes a flat support attached to a telescopic support arm.

U.S. patent application Ser. No. 11/098,638, Publication No. 2005/0166484, filed by Richmond, entitled "Device and Method for Installing Building Material", discloses a hand-held clamp with a cross-member or resting surface on which the clamped material sits. That hand tool enables a user to move and align building materials, such as drywall, for nailing to wall studs.

U.S. Pat. No. 6,494,513 to Worthington, entitled "Hand Tool for Gripping and Carrying Objects", discloses a hand tool for gripping and moving building materials, such as drywall.

U.S. Pat. No. 7,373,862 to Tyler, entitled "Clamp Device", discloses a locking clamp having two extended vertical arms. An individual can use this clamp to lift and transport building materials.

U.S. Pat. No. 8,303,228 to Gosis et al., entitled "Metal to Metal Cleat", discloses a "cleat"—a tapered, flat, metal piece with jagged sides. The cleat tapers to an end, which can be hammered into a support beam.

A Seller, identified as "Free Hands Drywall Cletes" on Amazon.com, has designed a "Free Hands Drywall Installation tool". The tool is generally "L"-shaped which can be screwed into a support beam. The vertical stem of the L is partially recessed on its backside, adjacent the beam. An installer can insert a sheet rock into that recess for support.

U.S. patent application Ser. No. 11/051,583, Publication No. 2006/0185278, filed by Jaffe, entitled "Dry Wall Installation Clips", discloses a generally "U"-shaped holder or clip. To attach the clip to an overhead beam, a user drives a nail through a hole in the clip and into the beam. The clip can then support a sheet at one end. That allows one person to install this material without additional help.

Accordingly, it is a primary object of the present invention to provide an improved "Tool for Hanging Sheathing" which overcome the problems associated with the prior art.

It is another general object to provide a sheetrock support tool which does not require any separate nails or screws to install, and is simple to use.

It is another general object, commensurate with the above-listed objects, to provide a tool which can be quickly removed from an underlying structure and reused if undamaged.

SUMMARY OF THE INVENTION

Applicant has disclosed a method and device (i.e., tool) for supporting sheathing (e.g., drywall) prior to securing the sheathing to, for example, stud boards or rafters. In the preferred "device" embodiment, Applicant's tool is generally "J"-shaped with four short tapered spikes (brads or "teeth") on its backside. By hammering the front of the tool, its teeth can be driven into the underlying structure, e.g., the wall stud. That firmly locks the tool in place without the need for separate nails or screws. Then a user can place one corner of the sheathing into a lipped bottom of the tool, where it is supported until the sheathing is secured (e.g., nailed or screwed) to the underlying structure.

BRIEF DESCRIPTION OF THE DRAWINGS

The above and other objects of the current invention will become more readily understood when the following text is read in conjunction with the accompanying drawings, in which.

DETAILED DESCRIPTION OF THE PREFERRED EMBODIMENT

Applicant has disclosed a method and device (i.e., a tool) for temporarily supporting sheathing (e.g., drywall) prior to securing the sheathing to underlying structure, such as wall studs or rafters. This device, nicknamed the "STUD HUGGER", is useful in cases where size, weight, time, position and lack of manpower tend to make supporting sheathing difficult especially if the user is working alone.

Figure 1:
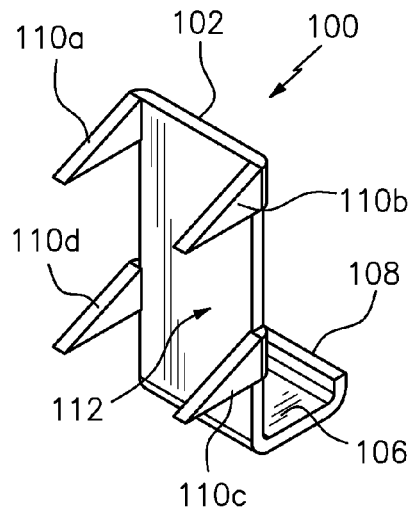
FIG. 1 is a rear perspective view of a preferred embodiment of Applicant's "SUPPORT FOR HANGING SHEATHING"
Figure 2:
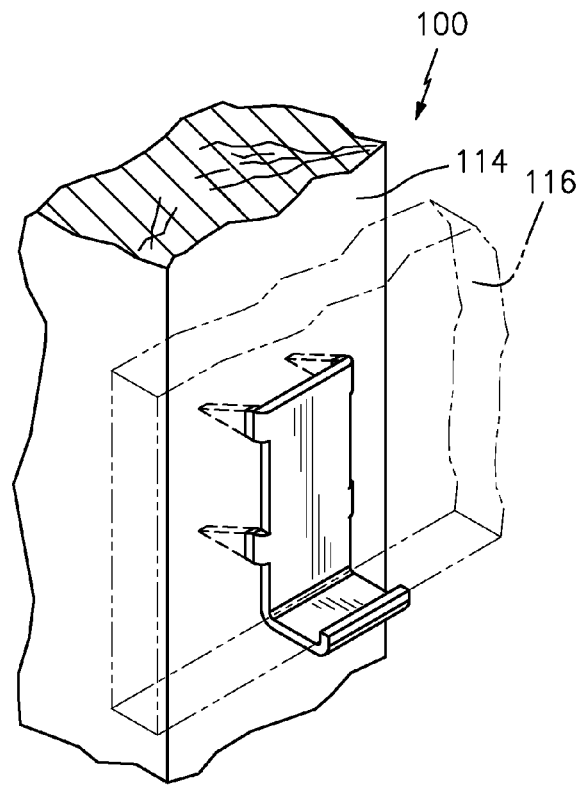
FIG. 2 depicts the preferred support attached to a wall board and supporting a corner of a drywall sheet.
Figure 3:
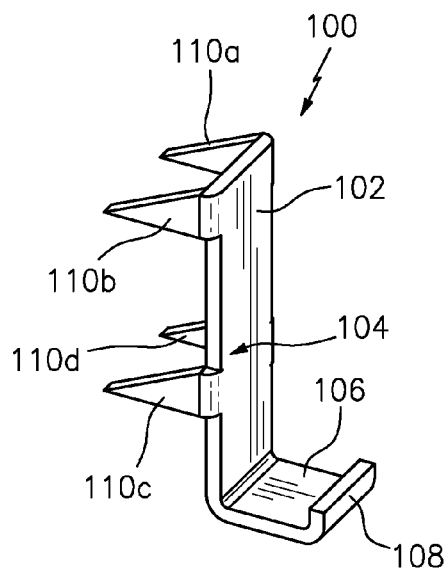
FIG. 3 is a rear perspective view of the support shown in FIG. 1.

FIGS. 1-3 depict a preferred embodiment 100 of the "STUD HUGGER". As shown, Applicant's preferred device 100 is generally "J"-shaped. It is preferably made of metal, but could be made in plastic.

The preferred embodiment 100 comprises: a vertical stem 102 having a flat front side 104; a flat bottom 106, integral with and substantially perpendicular to the stem 102; and an upturned lip 108, integral with the bottom 106 and substantially parallel to stem 102. While the preferred lip is substantially perpendicular to the bottom 104, it alternatively can be an acute angle relative to bottom 106. Tapered spikes (a.k.a. brads or teeth) 110a, 110b, 110c, 110d are integral with and protrude from a backside 112 of the stem 102. The spikes are equally spaced apart, with: spikes 110a, 110d at one edge of the backside 112; spikes 110b, 110c at another edge of the backside; and spikes 110a, 110b adjacent respective corners of the backside. Upon hammering the spikes 110a, 110b, 110c, 110d into a supporting structure 114 (e.g., the depicted wall stud), the spikes provide a reliable means of resisting the downward force of the weight of the sheathing 116 (e.g., drywall) resting on the bottom 106, which acts as a shelf.

By hammering the front side 104, the tool's spikes 110a, 110b, 110c, 110d can be driven into the underlying structure, e.g., the illustrated wall stud 114. See FIG. 2. If at least two spikes are driven in, that firmly locks the tool 100 in place. No separate nails or screws are needed to secure the tool 100.

Once the tool 100 is hammered into place, a user can place one corner of the sheathing 116 into the shelf 106. That supports the sheathing 116 until it is nailed to the underlying structure 114.

Figure 4:
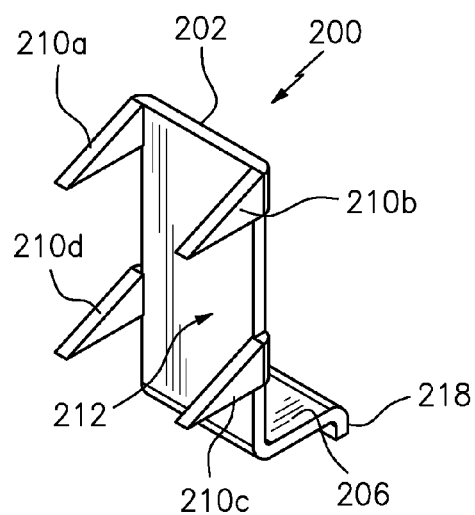
FIG. 4 is a front perspective view of an alternate embodiment of the support.

FIG. 4 depicts an alternate embodiment 200 of the STUD HUGGER. Its structure is virtually identical to the preferred embodiment. Identical elements in FIG. 4 have the prefix 200. For example, the vertical stem 102 in FIGS. 1-3 is denoted by 202 in FIG. 4. The only difference between the two embodiments is the lip 218 is downturned, not upturned, in FIG. 4.

Applicant's invention can be thought of as a method of temporarily supporting drywall comprising the following sequential steps:
   a. hammering a flat front side of a vertical stem of a (preferably J-shaped) support tool to drive a plurality of spikes on a backside of the stem into a wall stud, whereby the tool is locked in place without having to use any nail or screw;
   b. supporting a drywall sheet within a lipped shelf of the tool, wherein a flat portion of the shelf is integral with, and extends substantially perpendicular to, one end of the stem; and
   c. attaching the entire drywall sheet to the wall stud.

Additional method steps can comprise:
   a. the plurality of spikes is four spikes; and
   b. the spikes are equally spaced apart.

It should be understood by those skilled in the art that obvious structural modifications can be made to the depicted embodiments without departing from the spirit of the invention. For example, less spikes could be used, though less than two might make the tool unstable when secured into the underlying structure. In addition, the angles of the bottom and lip could differ.

I claim:

1. A method of supporting drywall comprising the following sequential steps:
   a. hammering a flat front side of a vertical stem of a support tool to drive into a wall stud a plurality of spikes, integral with and protruding from a backside of the stem, whereby the tool is locked in place without having to use any nail or screw even if only two of the spikes are driven into the wall stud;
   b. wherein:
      i. the plurality of spikes comprises four spikes; and
      ii. the four spikes are equally spaced apart;
   c. supporting a drywall sheet within a lipped shelf of the tool, wherein a flat portion of the shelf is integral with, and extends substantially perpendicular to, one end of the stem;
   d. attaching the entire drywall sheet to the wall stud.

2. A method of supporting sheathing comprising the following sequential steps:
   a. hammering a flat front side of a vertical stem of a support tool to drive at least two spikes of a plurality of spikes, integral with and protruding from a backside of the stem into an underlying support structure, whereby the tool is locked in place without having to use any nail or screw, even if only two spikes are driven into the support structure;
   b. supporting a sheet of sheathing within a lipped shelf of the tool, wherein a flat portion of the shelf is integral with, and extends substantially perpendicular to, one end of the stem; and
   c. attaching the sheathing to the underlying support structure.

3. The method of claim 2 wherein:
   a. the plurality of spikes is four spikes;
   b. the four spikes are equally spaced apart;
   c. two of the spikes are at one edge of the backside and two of the spikes are at another edge of the backside; and
   d. two of the spikes are adjacent respective corners of the backside.

4. The method of claim 3 wherein the underlying support structure is a rafter.

5. The method of claim 3 wherein the underlying support structure is a joist.

6. The method of claim 3 wherein the underlying support structure is a wall stud.

* * * * *